United States Patent [19]
Griffith et al.

[11] Patent Number: 5,571,318
[45] Date of Patent: Nov. 5, 1996

[54] WELL CEMENTING METHODS AND COMPOSITIONS FOR USE IN COLD ENVIRONMENTS

[75] Inventors: James E. Griffith; Patty L. Totten; Bobby L. King; Jiten Chatterji, all of Duncan, Okla.

[73] Assignee: Halliburton Company, Duncan, Okla.

[21] Appl. No.: 521,705

[22] Filed: Aug. 31, 1995

[51] Int. Cl.$^6$ .............................. C04B 7/02; C04B 24/16
[52] U.S. Cl. .................. 106/725; 106/726; 106/802; 106/809; 106/810; 106/808; 106/727; 106/816; 106/819; 106/823; 166/293; 166/294; 405/267
[58] Field of Search ..................... 106/724, 725, 106/726, 737, 802, 809, 810, 816, 727, 808, 819, 823; 405/266, 267; 166/285, 293, 294, 292; 524/2, 650

[56] References Cited

U.S. PATENT DOCUMENTS

| | | | |
|---|---|---|---|
| 4,015,991 | 4/1977 | Persinski et al. | 106/90 |
| 4,160,674 | 7/1979 | Sawyer | 106/89 |
| 4,353,746 | 10/1982 | Birchall et al. | 106/727 |
| 4,555,269 | 11/1985 | Rao et al. | 106/90 |
| 4,761,183 | 8/1988 | Clarke et al. | 106/117 |
| 5,086,850 | 2/1992 | Harris et al. | 175/61 |
| 5,121,795 | 6/1992 | Ewert et al. | 166/292 |
| 5,125,455 | 6/1992 | Harris et al. | 166/292 |
| 5,263,542 | 11/1993 | Brothers | 166/293 |
| 5,346,012 | 9/1994 | Heathman et al. | 106/727 |

OTHER PUBLICATIONS

Kosmatka et al., "Design & Control of Concrete Mixtures", Thirteenth edition, 1988, PCA, Table 6–1 & p. 66. (no month).

*Primary Examiner*—Mark L. Bell
*Assistant Examiner*—Michael Marcheschi
*Attorney, Agent, or Firm*—Craig W. Roddy; C. Clark Dougherty, Jr.

[57] ABSTRACT

The present invention provides well cementing methods and compositions for use in cold environments which are particularly suitable for cementing conductor strings in deep water offshore wells. The cement compositions are basically comprised of a relatively coarse particulate hydraulic cement mixed with an ultra fine particulate hydraulic cement, sufficient water to form a pumpable slurry and a fluid loss control additive.

20 Claims, No Drawings

WELL CEMENTING METHODS AND COMPOSITIONS FOR USE IN COLD ENVIRONMENTS

BACKGROUND OF THE INVENTION

1. Field of the Invention

The present invention relates to well cementing methods and compositions for use in cold subterranean environments, and more particularly, but not by way of limitation, to methods and compositions for cementing conductor strings in deep water offshore wells.

2. Description of the Prior Art

In carrying out completion operations in oil, gas and water wells, hydraulic cement compositions are commonly utilized. For example, hydraulic cement compositions are used in primary cementing operations whereby pipe such as casing is cemented in the well bore. That is, a hydraulic cement composition is pumped into the annular space between the walls of the well bore and the exterior of a pipe disposed therein. The cement composition is permitted to set in the annular space thereby forming an annular sheath of hardened impermeable cement therein. The objective of the cement sheath is to physically support and position the pipe in the well bore and bond the pipe to the walls of the well bore whereby the undesirable migration of fluids between zones or formations penetrated by the well bore is prevented.

Completion and remedial cementing operations carried out in wells at low temperatures, e.g., temperatures as low as about 40° F., are particularly difficult as a result of the delay in the setting of the cement. That is, the lower the temperature to which a cement composition is subjected, the longer it takes for the cement composition to set. In order to allow a well cement composition time to be mixed on the surface and then pumped into a subterranean zone in a well before the cement composition develops gel strength and sets, a set retarding additive is commonly included in the cement composition. At low temperatures, the set retarding additives often delay the setting of cement compositions for times which are too long, even when only very small quantities of the set retarding additives are utilized, making the cost of the completion or remedial procedure prohibitive.

Another problem which occurs when a cement composition used in primary cementing is slow to set is the occurrence of pressurized formation fluid flow into and through the annulus before and after the cement composition sets. Such an occurrence is attributable to the inability of the cement composition to transmit hydrostatic pressure during the transition of the cement composition from a true fluid to a hard set mass. During the transition phase, initial hydration of the cement composition has begun and the slurry starts to develop static gel strength. While the cement composition has little or no compressive strength, it becomes partially self-supporting which lowers the hydrostatic pressure exerted by the composition on pressurized fluid containing formations penetrated by the well bore. That is, when a cement composition becomes partially self-supporting due to the development of gel strength prior to setting, volume reductions in the cement composition (caused by hydration and fluid loss) result in rapid decreases in the hydrostatic pressure exerted by the cement composition. When the pressure exerted by the cement composition falls below the pressure of formation fluids, the formation fluids enter the annulus and flow through the cement composition forming flow passages which remain after the cement composition sets and/or diluting the cement composition with water which prevents its ability to subsequently develop sufficient compressive strength and provide a competent seal.

The foregoing problems are aggravated in offshore wells which are completed in deep cold water. Such wells include conductor pipes which are cemented from the seafloor or mud line to a depth generally under about 2000 feet below the mud line. The formations between the mud line and about 2000 feet are usually relatively young geologically and are not well consolidated. The formations are largely a product of erosion from the continental shelf, and consequently, the formations readily fracture and often have abnormally high artesian water sand flow.

When cementing conductor string casing in the subterranean formation adjacent to the seafloor, the cold temperature of the cement composition after being pumped through the seawater causes the cement composition hydration to be slowed and the transition time to be extended, and as a result, the cement composition often allows the influx of water and other fluids into the annulus. These conditions can lead to cementing job failure, costly remedial work, and increased expense and rig time.

While cementing processes have been developed which improve the success rate of cementing conductor pipe casing in deep water offshore wells and in other low temperature applications, there is still a need for improved well cementing methods and compositions for use in such cold environments.

SUMMARY OF THE INVENTION

The present invention provides improved well cementing methods and compositions for use in cold environments, i.e., in subterranean zones where the cement composition has a temperature as low as about 40° F. The improved cement compositions are basically comprised of a relatively coarse particulate hydraulic cement having a maximum particle size of about 118 microns and a specific surface of about 2800 square centimeters per gram, and an ultra fine particulate hydraulic cement having a maximum particle size of about 15 microns and a specific surface of about 12000 square centimeters per gram. The ultra fine particulate cement is generally present in the composition in an amount in the range of from about 5% to about 150% by weight of the coarse particulate hydraulic cement. Sufficient water is present in the composition to form a pumpable slurry and the composition includes a fluid loss control additive.

The methods of the present invention basically comprise placing an aqueous cement composition of the present invention in a zone in the well to be cemented and maintaining the cement composition in the zone for a time sufficient for the cement composition to set into a hard impermeable mass therein.

It is, therefore, an object of the present invention to provide improved well cementing methods and compositions for use in cold environments.

Other and further objects, features and advantages of the present invention will be readily apparent to those skilled in the art upon a reading of the description of preferred embodiments which follows.

DESCRIPTION OF PREFERRED EMBODIMENTS

As mentioned above, in well completion and remedial cementing at low temperatures, i.e., from 40° F. to about 70° F., a problem that is frequently encountered is the inability of the cement composition to set in a reasonable time period, and/or the inability of the cement composition to achieve zonal isolation in the annulus between a cemented pipe and the walls of the well bore. This problem is aggravated in the cementing of offshore well conductor pipe casing in the water sand formations below the seafloor. The water depths create temperatures as low as about 40° F. at the mud line and the formation temperature below the mud line varies from about 50° F. to about 70° F. over the depth of from 300 feet to 2000 feet below the mud line. Thus, the cement compositions utilized must set and develop compressive strength at a temperature in the range of from about 40° F. to about 70° F. The water sand formations contain water which is pressure driven, and in addition, shallow gas zones are often encountered whereby pressurized gas can also enter the annulus.

Another problem in cementing offshore deep water well conductor string casing involves the lack of cement composition hydrostatic pressure which promotes water and/or gas influx into the annulus. That is, offshore deep water wells lack a riser that allows weighted muds or pump pressure to mechanically exert pressure on top of the cement column in the annulus. Finally, the water sand formations immediately below the seafloor have relatively low fracture gradients whereby the density of the cement composition must be maintained at a relatively low level to prevent fracturing and cement composition loss.

The cement compositions utilized for low temperature cementing generally, and in the primary cementing of conductor string casing in offshore deep water wells, must have low densities, short transition times, good fluid loss control, good free water control and high compressive strengths.

The cement compositions of this invention have densities which are relatively low, i.e., densities in the range of from about 11 to about 15.5 lb/gal.

The transition time of a cement composition is the length of time from when the composition begins to develop crystals to the time it possesses compressive strength. Quantitatively, the transition time starts at the time the slurry possesses 100 $lb_f$ per 100 ft$^2$ of gel strength and ends when the slurry has 500 $lb_f$ per 100 ft$^2$ of gel strength. It is during the transition time of the cement composition that hydrostatic pressure begins to decrease on formations having potential water and/or gas flow. If the hydrostatic pressure decreases enough, water and/or gas can enter the annulus and flow through the setting cement which prevents the cement from sealing the annulus. The transition times of the cement compositions of this invention are below about 50 minutes at temperatures as low as 50° F. and preferably less than about 30 minutes. The transition times of conventional cement slurries utilized heretofore often exceed 3 hours under the same conditions.

As concerns fluid loss control, the cement compositions of this invention have excellent fluid loss control, i.e., an API fluid loss of less than 50 cc in 30 minutes. In addition, the cement compositions develop an almost impermeable filter cake. Conventional cement slurries utilized heretofore often exceed 700 cc fluid loss in 30 minutes.

The cement compositions of this invention also have excellent free water control. This is especially important in deviated wells where free water formation increases the chances of channeling on the high side of the well bore where water accumulates. Typically, the cement compositions have 0% free water at a 45° angle. Conventional cement slurries usually exhibit little or no free water control.

The cement compositions of this invention also have pump times at about 60° F. of about 4 hours and gain 100 psi compressive strengths in 12 hour time periods at temperatures as low as 50° F.

Thus, the cement compositions of the present invention possess all of the properties mentioned above as well as other advantageous properties and are ideally suited for conducting cementing operations at low temperatures. The cement compositions are particularly suitable for cementing conductor string casing in offshore deep water well as described above.

The cement compositions of this invention are basically comprised of a relatively coarse particulate hydraulic comprised of a relatively coarse particulate hydraulic cement, an ultra fine particulate hydraulic cement, sufficient water to form a pumpable slurry and a fluid loss control additive.

The relatively coarse particulate hydraulic cement can be any of a variety of hydraulic cements having a maximum particle size of about 118 microns and a specific surface area of about 2800 square centimeters per gram. Portland cement is generally preferred, and the relatively coarse cement can be, for example, one or more of the various Portland cements designated as API Classes A–H cements. These cements are identified and defined in the *API Specification For Materials And Testing For Well Cements*, API Specification 10 fifth edition, dated Jul. 1, 1990, of the American Petroleum Institute. API Portland cements generally have a maximum particle size of about 90 microns and a specific surface of about 3900 square centimeters per gram. When an API Portland cement is utilized as the coarse hydraulic cement in accordance with this invention, it is preferably API Class H cement for cement compositions having densities greater or equal to 14 lb/gal and Class A cement for lower density compositions.

Other hydraulic cements which are more coarse than API Portland cement can also be used up to the maximum particle size set forth above. Such more coarse cements preferably have properties which are the same or similar to API Classes G or H Portland cements.

The ultra fine particulate hydraulic cement useful in accordance with the present invention has a maximum particle size of about 15 microns and a specific surface of about 12000 square centimeters per gram. More preferably, the cement particles have diameters no larger than about 10 microns. The distribution of the various size particles within the ultra fine cementitious material having a maximum particle size of about 15 microns, i.e., the particle size distribution, is such that about 90% of the particles have diameters no greater than about 10 microns; 50% have diameters no greater than about 5 microns; and 20% of the particles have diameters no greater than about 3 microns.

The specific surface of the ultra fine hydraulic cement (sometimes also referred to as Blaine fineness) is an indication of the ability of the cement to chemically interact with other materials. The specific surface is preferably greater than about 12000 square centimeters per gram and more preferably greater than about 13000 centimeters per gram.

Ultra fine cements having maximum particle sizes and surface areas as set out above are disclosed in various prior U.S. patents including U.S. Pat. No. 4,761,183 issued to Clarke during August, 1988 which discloses ultra fine particle size cement formed of slag and mixtures thereof with Portland cement, and U.S. Pat. No. 4,160,674 issued to Sawyer during July, 1979 which discloses ultra fine particle size Portland cement. The ultra fine particle size hydraulic cement preferred for use in accordance with this invention is Portland cement and combinations thereof with slag wherein the quantity of Portland cement in the mixture is preferably no less than about 40% by weight, more preferably about 60% by weight and most preferably 100%. Methods of utilizing ultra fine particle size hydraulic cement in primary and squeeze cementing operations are disclosed in U.S. Pat. No. 5,121,795 issued to Ewert et al. on Jun. 16, 1992 and U.S. Pat. No. 5,125,455 issued to Harris et al. on Jun. 30, 1992, both of which are incorporated herein by reference.

The ultra fine cement is included in the cement compositions of this invention to bring about short cement composition transition times and rapid development of compressive strengths. Generally, the ultra fine cement is included in the cement compositions in an amount in the range of from about 5% to about 150% by weight of the relatively coarse cement in the compositions.

The water used in the cement compositions of this invention can be water from any source provided it does not contain an excess of compounds which adversely react with or otherwise affect other components in the cement compositions. For example, the water can be fresh water, salt water, brines or seawater. In offshore applications, it is convenient to utilize seawater for forming the cement compositions. The water is present in a cement composition in an amount sufficient to form a slurry of the cement which is readily pumpable. Generally, the water is present in the range of from about 45% to about 450% by weight of the relatively coarse hydraulic cement in the composition.

The fluid loss control additive utilized in the cement compositions of this invention can be any of a variety of fluid loss control additives which are well known to those skilled in the art and which prevent the loss of disadvantageous amounts of fluid (water) from the cement compositions prior to setting. Preferred such fluid loss control additives are selected from the group consisting of copolymers of 2-acrylamido-2-methyl propane sulfonic acid and acrylamide, copolymers of 2-acrylamido-2-methyl propane sulfonic acid and N,N-dimethylacrylamide; and mixtures of such copolymers. These fluid loss control additives are described in U.S. Pat. No. 4,015,991 issued to Persinski on Apr. 5, 1977 and U.S. Pat. No. 4,555,269 issued to Rao et al. on Nov. 26, 1985, and are commercially available from Halliburton Energy Services of Duncan, Okla. under the tradenames "HALAD®4" and "HALAD®344", respectively The fluid loss additive utilized is preferably included in the cement composition in an amount in the range of from about 0.1% to about 3% by weight of the coarse hydraulic cement in the composition.

Other well known additives can also be included to provide the various properties listed above. One such additive is a defoaming additive for preventing foaming during mixing and pumping of the cement compositions. The defoaming additive can comprise substantially any of the compounds known for such capabilities such as the polyol silicone compounds. Particularly suitable such additives are commercially available from Halliburton Energy Services of Duncan, Okla. under the trade designations "D-AIR™." Defoaming additives are generally mixed with the cement compositions in an amount in the range of from about 0.01% to about 0.5% by weight of the coarse hydraulic cement therein.

Another additive which can be utilized in the cement composition of this invention is a dispersing additive. Some compositions require lower water to cement ratios to shorten the transition time, increase the early compressive strength, and/or increase the density of the slurry. Adjustment of the slurry properties is sometimes required prior to slurry mixing and is dictated by the individual well conditions. With lower water to cement ratio compositions, the dispersing additive allows the fluids to properly wet the dry material during the mixing process. The dispersing additive increases the overall mixability of the slurry and helps the fluid activation of required dry additives. When the dispersing additive is required, the preferred range of dispersing additive is about 0.025% by weight of coarse cement to about 1% by weight of coarse cement. Still further, comprised of sodium naphthalene sulfonate condensed with formaldehyde, or condensation product of acetone, formaldehyde and bisulfite which are available from Halliburton Energy Services, Duncan, Okla., under the names of "CFR-2" and "CFR-3", respectively.

Another additive which can be utilized in the cement compositions of this invention is a set retarding additive. When a cement composition must remain pumpable for a relatively long period of time in order to place it in a subterranean zone to be cemented such as is generally the case in primary cementing operations carried out in offshore deep water wells, a set retarding additive is included in the cement composition. The set retarding additive delays or retards the setting of the cement composition whereby it remains pumpable for the time period required. The particular quantity of a specific set retarder which must be included in a cement composition to provide the necessary pumping time at the temperature and other conditions to be encountered can be determined in advance by performing thickening time tests of the type described in the above mentioned API Specification 10.

While a variety of set retarding additives which are well known to those skilled in the art can be utilized, a particularly preferred such set retarding additive is comprised of a methylenephosphonic acid derivative selected from the group consisting of:

(1) compounds having the general formula:

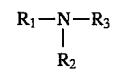

wherein:

$R_1$, $R_2$ and $R_3$ are independently hydrogen, $-CH_2PO_3(X)_2$ or $-CH_2CH_2-O-PO_3(X)_2$ with the limitation that one of $R_1$, $R_2$ and $R_3$ is always $-CH_2PO_3(X)_2$ or $-CH_2CH_2-O-PO_3(X)_2$;

X is hydrogen, an alkali metal cation, ammonium, a protonated amine or an alkaline earth metal cation in which case there is only one X per methylenephosphonate group; and at least one X is hydrogen which is associated with the nitrogen atom by way of an intramolecular hydrogen bond between the nitrogen atom and an oxygen atom attached to a phosphorus atom;

(2) compounds having the general formula:

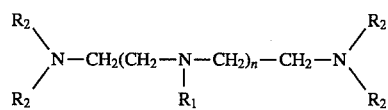

wherein:

n is an integer from 1 to 4;

$R_1$ is hydrogen or $-CH_2PO_3(X)_2$;

$R_2$ is hydrogen, $-CH_2PO_3(X)_2$ or $-CH_2CH_2N(R_3)_2$ wherein $R_3$ is hydrogen or $-CH_2PO_3(X)_2$;

X is hydrogen, an alkali metal cation, ammonium, a protonated amine or an alkaline earth metal cation in which case there is only one X per methylene phosphonate group; and at least one of $R_1$, $R_2$ or $R_3$ is —$CH_2PO_3(X)_2$ and one X is hydrogen which is associated with a nitrogen atom by way of an intramolecular hydrogen bond between the nitrogen atom and an oxygen atom attached to a phosphorus atom;

(3) compounds having the general formula:

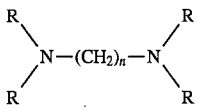

wherein:

n is an integer from 2 to 6;

R is hydrogen, —$CH_2PO_3(X)_2$ or —$CH_2CH_2N(R_1)_2$ wherein $R_1$ is hydrogen or —$CH_2PO_3(X)_2$;

X is hydrogen, an alkali metal cation, ammonium, a protonated amine or an alkaline earth metal cation in which case there is only one X per methylene phosphonate group; and at least one R is —$CH_2PO_3(X)_2$ and one X is hydrogen which is associated with a nitrogen atom by way of an intramolecular hydrogen bond between the nitrogen atom and an oxygen atom attached to a phosphorus atom; and (4) compounds having the general formula:

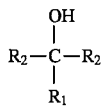

wherein:

$R_1$ is hydrogen or —$CH_3$;

$R_2$ is $PO_3(X)_2$ or —$CH_2PO_3(X)_2$;

X is hydrogen, an alkali metal cation, ammonium, a protonated amine or an alkaline earth metal cation in which case there is only one X per methylene phosphonate group; and when nitrogen is present, at least one X is hydrogen which is associated with the nitrogen atom by way of an intramolecular hydrogen bond between the nitrogen atom and an oxygen atom attached to a phosphorus atom.

Particularly suitable methylenephosphonic acid derivative set retarders falling within the definition set forth in category (1) above are aminotri(methylenephosphonic acid), the sodium salt of aminotri(methylenephosphonic acid) and triethanol amine substituted with three moles of methylenephosphonic acid. Of the foregoing retarders, aminotri (methylenephosphonic acid) is preferred. Particularly suitable retarders falling within category (2) above include ethylenediamine substituted with 1 to 4 moles of methylenephosphonic acid, the sodium salt of the foregoing compound, diethylenetriamine substituted with 1 to 5 moles of methylenephosphonic acid and triethylenetetramine substituted with 1 to 6 moles of methylenephosphonic acid. Of these, diethylenetriaminepenta (methylenephosphonic acid) is preferred. Preferred category (3) retarders are ethylenediaminetetra (methylenephosphonic acid) and hexamethylenediaminetetra (methylenephosphonic acid). A preferred category (4) retarder is 1-hydroxyethylidene-1,1-diphosphonic acid (HEDP).

The most preferred set retarder for use in the cement compositions of this invention is aminotri (methylene phosphonic acid). It or one or more of the other preferred set retarders described above are preferably included in a cement composition of this invention in an amount in the range of from about 0.5 gallons per 100 sacks of the coarse cement (gphs) to about 10 gphs, most preferably an amount in the range of from about 2 gphs to about 4 gphs.

Another additive which can be included in the cement compositions of this invention is a cement early strength accelerator. A preferred such compressive strength accelerator is calcium chloride. Generally, when used, calcium chloride is included in the cement compositions in an amount in the range of from about 1% to about 15% by weight of the coarse hydraulic cement therein.

Yet another additive which can be included in the cement composition is a cement extender and compressive strength enhancer selected from the group consisting of silica fume, hollow ceramic beads and mixtures of silica fume and hollow ceramic beads. The silica fume imparts an early pozzolanic-type reaction in the hydration of the cement composition and thereby enhances the compressive strength development of low temperature lightweight cements. The hollow ceramic beads also function as a low density cement composition extender and compressive strength improver. The silica fume and hollow ceramic beads are generally each included in a lightweight cement composition in an amount in the range of from about 5% to about 75% by weight of the coarse hydraulic cement in the composition.

Various other cement additives which are known to those skilled in the art can be included in the cement compositions of this invention as required to provide the specific properties to the cement compositions required for particular applications.

A particularly preferred cement composition of the present invention which is particularly suitable for cementing conductor pipe casing and the like in offshore deep water wells and which has a density in the range of from about 11 to about 13 lb/gal is comprised of the following components:

(1) a relatively coarse particulate Portland cement having a maximum particle size of about 90 microns and a specific surface of about 3900 square centimeters per gram;

(2) an ultra fine particulate Portland cement having a maximum particle size of about 15 microns and a specific surface of about 12000 square centimeters per gram, the ultra fine particulate cement being present in an amount in the range of from about 20% to about 125% by weight of the relatively coarse particulate cement in the composition;

(3) sufficient water to form a pumpable slurry;

(4) a fluid loss control additive comprised of a water soluble copolymer of 2-acrylamido-2-methyl propane sulfonic acid and acrylamide present in an amount in the range of from about 1.5% to about 2.5% by weight of the relatively coarse cement in the composition;

(5) calcium chloride present in an amount in the range of from about 4% to about 12% by weight of the relatively coarse cement in the composition;

(6) silica fume present in an amount in the range of from about 5% to about 25% by weight of the relatively coarse cement in the composition; and (7) hollow ceramic beads present in an amount in the range of from about 5% to about 25% by weight of the relatively coarse cement in the composition.

As will be understood, the above described cement composition can also include a set retarding additive, a defoaming additive and other additives as required by the particular cementing application in which the composition is to be used.

Another particularly preferred cement composition of this invention which has a density in the range of from about 14 to about 15.5 lb/gal is comprised of the following components:

(1) a relatively coarse particulate Portland cement having a maximum particle size of about 118 microns and a specific surface of about 2800 square centimeters per gram;

(2) an ultra fine particulate Portland cement having a maximum particle size of about 15 microns and a specific surface of about 12000 square centimeters per gram, the ultra fine particulate cement being present in an amount in the range of from about 5% to about 35% by weight of the relatively coarse particulate cement in the composition;

(3) sufficient water to form a pumpable slurry;

(4) a fluid loss control additive comprised of a water soluble copolymer of 2-acrylamido-2-methyl propane sulfonic acid and N,N-dimethylacrylamide present in an amount in the range of from about 0.75% to about 1.25% by weight of the relatively coarse cement in the composition;

(5) a set retarder comprised of aminotri (methylenephosphonic acid) present in an amount in the range of from about 2 gphs to about 4 gphs; and (6) a defoaming additive comprised of silicone compounds present in an amount in the range of from about 0.15% to about 0.25% by weight of relatively coarse cement in the composition.

Additional additives such as calcium chloride and others can be included in the composition as required.

The methods of the present invention for cementing in a well at a temperature as low as about 40° F. basically comprise the steps of placing an aqueous cement composition of the present invention in a zone in the well to be cemented, and maintaining the cement composition in the zone for a time sufficient for the cement composition to set into a hard impermeable mass therein.

Because the cement compositions have relatively low densities, pump times at 60° F. of about 3 hours, transition times of about 30 minutes, little or no free water development, low fluid loss, i.e., less than about 50 cc fluid loss in 30 minutes, zero gel times (the time from placement to when the composition has 100 lb$_f$/100 ft$^2$ of gel strength) of about 10 minutes and develop excellent compressive strengths at low temperature in a relatively short period of time, the methods of this invention using the cement compositions achieve excellent results, particularly in low temperature applications such as offshore deep water wells.

In order to further illustrate the methods and cement compositions of this invention, the following examples are given.

EXAMPLE 1

Various cement compositions having densities of 15.5 lbs. per gallon were prepared utilizing Class H Portland cement, which is a relatively coarse particulate hydraulic cement having a maximum particle size of about 118 microns and a specific surface of about 2800 square centimeters per gram. In addition to the relatively coarse cement, 2% calcium chloride by weight of coarse cement and 1% by weight of coarse cement of a fluid loss additive comprised of a copolymer of 2-acrylamido-2-methyl propane sulfonic acid and N,N-dimethylacrylamide were included in the cement compositions along with varying amounts of an ultra fine particulate hydraulic cement and varying quantities of seawater. The ultra fine cement was Portland cement having a maximum particle size of about 15 microns and a specific surface area of about 12000 square centimeters per gram. Each of the cement compositions was tested for thickening time at 80° F. in accordance with the test procedure set forth in the above mentioned API Specification 10.

The quantities of components in the various cement compositions which were tested, a rheology reading directly relating to shear stress at 300 rpm for each of the compositions and the thickening times to reach 70 Bearden units of consistency for some of the compositions are set forth in Table I below.

TABLE I

Cement Composition[1] Rheology And Thickening Time Screening Tests

| Cement Composition No. | Ultra Fine Cement, % By Weight Of Relatively Course Cement | Seawater, % By Weight Of Relatively Course Cement | Rheology Reading At 300 rpm, Bc | Thickening Time, Hr:Min |
|---|---|---|---|---|
| 1 | 10 | 55.9 | 164 | — |
| 2 | 15 | 58.26 | 165 | — |
| 3 | 20 | 60.61 | 190 | 3:05 |
| 4 | 25 | 62.95 | 202 | 2:45 |
| 5 | 30 | 65.3 | 151 | 2:26 |

[1]Cement compositions all included a relatively coarse particulate cement (Class H Portland Cement) having a maximum particle size of 118 microns and a specific surface of 2800 cm$^2$/gm; 2% CaCl$_2$ by weight of Class H Cement; and 1% of a fluid loss additive by weight of cement (a copolymer of 2-acrylamido-2-methyl propane sulfonic acid and N,N-dimethylacrylamide).

Cement composition No. 5 was selected for further testing based on its having the lowest rheology and therefore, the greatest pumpability.

Additional test cement composition samples were prepared at densities of 14.5 lbs. per gallon and 15.5 lbs. per gallon which included the above described ultra fine cement in an amount of 30% by weight of the above described relatively coarse Class H cement, the above described fluid loss additive in the amount of 1% by weight of the coarse cement, set retarder [aminotri (methylene phosphonic acid)] in the amount of 3 gphs and seawater. The 15.5 lb. per gallon density cement composition included seawater in the amount of 65% by weight of the coarse cement in the composition and the 14.5 lb. per gallon density cement composition included seawater in the amount of 83% by weight of the coarse cement in the composition. The two cement compositions were tested for thickening time, compressive strength, fluid loss, free water, transition time, job placement time and zero gel time. The results of these tests are set forth in Table II below.

TABLE II

Cement Composition Tests At Densities Of 14.5 lb/gal And 15.5 lb/gal

| Type Of Test | TEST RESULTS | |
|---|---|---|
| | 14.5 lb/gal Cement Composition[1] | 15.5 lb/gal Cement Composition[2] |
| Thickening Time, Hr:Min | 4:40 | 4:50 |

TABLE II-continued

Cement Composition Tests At Densities Of 14.5 lb/gal And 15.5 lb/gal

| Type Of Test | TEST RESULTS | |
| --- | --- | --- |
| | 14.5 lb/gal Cement Composition[1] | 15.5 lb/gal Cement Composition[2] |
| 24 Hr. Compressive Strength at 50° F., psi | 366 | 130 |
| Fluid Loss at room temperature, mls in 30 min. | 32 | 32 |
| Free Water at 70° F., % | 0 | 0 |
| 70° F. Transition Time[3], hr:min | 0:22 | 0:40 |
| 70° F. Job Placement Time, hr:min | 3:00 | 3:00 |
| 70° F. Zero Gel Time[4], hr:min | 0:54 | 1:41 |

[1]The 14.5 lb/gal cement composition includes the relatively coarse particulate cement (Class H Portland Cement) described above; the ultra fine cement described above in an amount of 30% by weight of relatively coarse cement; 1% of the fluid loss additive described above by weight of coarse cement; 3 gphs of aminotri(methylenephosphonic acid) set retarder; and 83% seawater by weight of coarse cement.
[2]The 15.5 lb/gal cement composition includes the relatively coarse particulate cement (Class H Portland Cement) described above; the ultra fine particulate cement described above in an amount of 30% by weight of the relatively coarse cement; 1% of the above described fluid loss additive by weight of coarse cement; 3 gphs of the above described set retarder; and 65% seawater by weight of coarse cement.
[3]Transition time is the period of time from when the cement composition possesses 500 lb$_f$/100 ft$^2$ of gel strength.
[4]Zero gel time is period of time from when the cement composition becomes static after placement to when the cement composition has 100 lb$_f$/100 ft$^2$ of gel strength.

From Table II it can be seen that the cement compositions of the present invention having densities of 14.5 and 15.5 lb/gal have excellent properties for use in low temperature cementing.

EXAMPLE 2

A test composition was prepared having a density of 12.5 pounds per gallon which included a relatively coarse particulate hydraulic cement, i.e., API Class A cement, having a maximum particle size of about 90 microns and a specific surface of about 3900 square centimeters per gram. An ultra fine Portland cement having a maximum particle size of about 15 microns and a specific surface area of about 12000 square centimeters per gram was included in the cement composition in an amount of about 100% by weight of the relatively coarse cement. In addition, the cement composition included sufficient seawater to form a pumpable slurry, a fluid loss control additive comprised of a water soluble copolymer of 2-acrylamido-2-methyl propane sulfonic acid and acrylamide present in an amount of 2% by weight of the relatively coarse cement in the composition, calcium chloride present in an amount of about 12% by weight of the relatively coarse cement, silica fume present in an amount of 10% by weight of coarse cement and hollow ceramic beads present in an amount of about 10% by weight of relatively coarse cement. Two samples of the cement composition were tested at 50° F. and 60° F., respectively, for 12, 24 and 72 hour compressive strengths, thickening time, zero gel time, and fluid loss. The sample which was tested at 50° F. was also tested for rheology at 110° F. The results of these tests are set forth in Table III below.

TABLE III

Cement Composition[1] Tests At Density Of 12.5 lb/gal

| Type Of Test | Test Results | |
| --- | --- | --- |
| | 50° F. | 60° F. |
| 12 Hr. Compressive Strength, psi | 185 | 214 |
| 24 Hr. Compressive Strength, psi | 517 | 664 |
| 72 Hr. Compressive Strength, psi | 889 | 1006 |
| Thickening Time, hr:min | 6:00 | 3:53 |
| Zero Gel Time, hr:min | 0:45 | 0:01 |
| Transition Time, hr:min | 0:30 | 0:10 |
| Fluid Loss, mls in 30 min | 55 | 63 |
| Rheology at 110° F. | | |
| 300 rpm | 164 | |
| 200 rpm | 121 | |
| 100 rpm | 80 | |

[1]The 12.5 lb/gal cement composition includes the relatively coarse cement (Class A Portland Cement) described above; the ultra fine cement described above in an amount of 100% by weight of relatively coarse cement; 2% of the fluid loss additive described above by weight of coarse cement; calcium chloride in an amount of 12% by weight of coarse cement; silica fume in an amount of 10% by weight of coarse cement; ceramic beads in an amount of 10% by weight of coarse cement and 205% seawater by weight of coarse cement.

The 12.5 density cement compositions of the present invention also have excellent properties for use in low temperature cementing.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A well cement composition for use in performing cementing operations in a subterranean zone at a temperature as low as about 40° F. comprising:

a coarse particulate hydraulic cement having a maximum particle size of about 118 microns and a specific surface of about 2800 square centimeters per gram;

an ultra fine particulate hydraulic cement having a maximum particle size of about 15 microns and a specific surface of about 12000 square centimeters per gram, said ultra fine particulate cement being present in an amount in the range of from about 5% to about 150% by weight of said coarse particulate hydraulic cement;

sufficient water to form a pumpable slurry; and a fluid loss control additive.

2. The composition of claim 1 wherein said coarse particulate hydraulic cement is Portland cement.

3. The composition of claim 1 wherein said coarse particulate hydraulic cement is Portland cement having a maximum particle size of about 90 microns and a specific surface of about 3900 square centimeters per gram.

4. The composition of claim 1 wherein said ultra fine particulate hydraulic cement is Portland cement.

5. The composition of claim 1 wherein said fluid loss control agent comprises a copolymer of 2-acrylamido-2-methyl propane sulfonic acid and acrylamide, a copolymer of 2-acrylamido-2-methyl propane sulfonic acid and N,N-dimethylacrylamide or mixtures of said copolymers, and is present in an amount in the range of from about 0.1% to about 3% by weight of said coarse hydraulic cement in said composition.

6. The composition of claim 1 which further comprises a cement early strength accelerator comprised of calcium chloride present in an amount in the range of from about 1% to about 15% by weight of said coarse cement in said composition.

7. The composition of claim 1 which further comprises a set retarding additive selected from the group consisting of aminotri (methylenephosphonic acid), diethylenetriaminepenta (methylenephosphonic acid), ethylenediamenetetra (methylenephosphonic acid), hexamethylenediamenetetra (methylenephosphonic acid) and 1-hydroxyethylidene-1,1-diphosphonic acid, present in an amount in the range of from about 0.5 gphs to about 10 gphs.

8. The composition of claim 1 which further comprises a cement extender and compressive strength enhancer selected from the group consisting of silica fume, hollow ceramic beads and mixtures thereof present in an amount in the range of from about 5% to about 75% by weight of said coarse cement in said composition.

9. The composition of claim 1 which further comprises a defoaming agent.

10. A well cement composition for use in performing conductor casing cementing operations in deep water off shore wells at temperatures as low as about 40° F. comprising:

a coarse particulate Portland cement having a maximum particle size of about 118 microns and a specific surface of about 2800 square centimeters per gram;

an ultra fine particulate Portland cement having a maximum particle size of about 15 microns and a specific surface of about 12000 square centimeters per gram, said fine particulate Portland cement being present in an amount in the range of from about 5% to about 150% by weight of said coarse particulate hydraulic cement;

sufficient seawater to form a pumpable slurry; and a fluid loss control additive comprising a copolymer of 2-acrylamido-2-methyl propane sulfonic acid and acrylamide or a copolymer of 2-acrylamido-2-methyl propane sulfonic acid and N,N-dimethylacrylamide present in an amount in the range of from about 0.1% to about 3% by weight of said coarse cement in said composition.

11. The composition of claim 10 which further comprises a cement early strength accelerator comprised of calcium chloride present in an amount in the range of from about 1% to about 15% by weight of said coarse cement in said composition.

12. The composition of claim 10 which further comprises a set retarding additive selected from the group consisting of aminotri (methylenephosphonic acid), diethylenetriaminepenta (methylenephosphonic acid), ethylenediamenetetra (methylenephosphonic acid), hexamethylenediamenetetra (methylenephosphonic acid) and 1-hydroxyethylidene-1,1-diphosphonic acid, present in an amount in the range of from about 0.5 gphs to about 10 gphs.

13. The composition of claim 10 which further comprises a cement extender and compressive strength enhancer selected from the group consisting of silica fume, hollow ceramic beads and mixtures thereof present in an amount in the range of from about 5% to about 75% by weight of said coarse cement in said composition.

14. The composition of claim 10 which further comprises a defoaming agent.

15. A method of cementing in a well at a temperature as low as about 40° F. comprising the steps of:

placing an aqueous cement composition in a zone in said well to be cemented; and maintaining said cement composition in said zone for a time sufficient for said cement composition to set into a hard impermeable mass therein;

wherein said cement composition is comprised of a coarse particulate hydraulic cement having a maximum particle size of about 118 microns and a specific surface of about 2800 square centimeters per gram, an ultra fine particulate hydraulic cement having a maximum particle size of about 15 microns and a specific surface of about 12000 square centimeters per gram present in an amount in the range of from about 5% to about 150% by weight of said coarse particulate hydraulic cement, sufficient water to form a pumpable slurry, and a fluid loss control additive.

16. The method of claim 15 wherein said coarse particulate hydraulic cement is Portland Class H cement.

17. The method of claim 15 wherein said coarse particulate hydraulic cement is Portland Class A cement having a maximum particle size of about 90 microns and a specific surface area of about 3900 square centimeters per grams.

18. The method of claim 15 wherein said fine particulate hydraulic cement is Portland cement.

19. The method of claim 15 wherein said fluid loss control agent comprises a copolymer of 2-acrylamido-2-methyl propane sulfonic acid and acrylamide or a copolymer of 2-acrylamido-2-methyl propane sulfonic acid and N,N-dimethylacrylamide, and is present in an amount in the range of from about 0.1% to about 3% by weight of said coarse cement in said composition.

20. The method of claim 15 which further comprises a set retarding additive selected from the group consisting of aminotri (methylenephosphonic acid), diethylenetriaminepenta (methylenephosphonic acid), ethylenediamenetetra (methylenephosphonic acid), hexamethylenediamenetetra (methylenephosphonic acid) and 1-hydroxyethylidene-1,1-diphosphonic acid, present in an amount in the range of from about 0.5 gphs to about 10 gphs.

* * * * *